Sept. 11, 1951 G. E. BUNKOWSKI 2,567,180
METAL SQUID FISHING LURE
Filed June 28, 1949
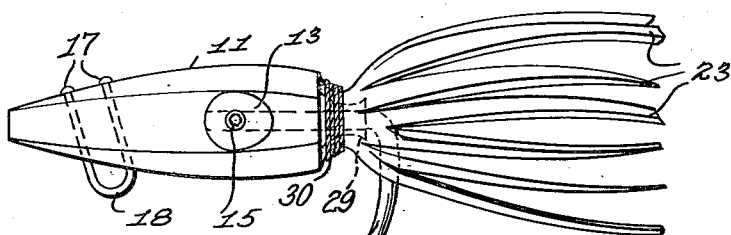
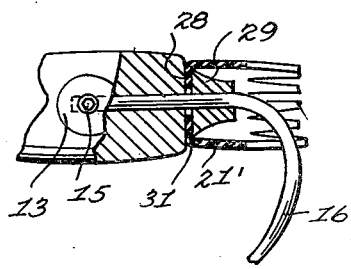
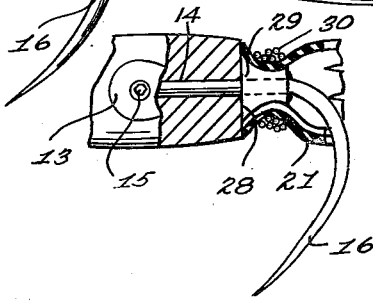
INVENTOR.
GUSTAV E. BUNKOWSKI
BY
McMorrow, Berman & Davidson
ATTORNEYS Patented Sept. 11, 1951

2,567,180

UNITED STATES PATENT OFFICE 2,567,180

METAL SQUID FISHING LURE

Gustav E. Bunkowski, San Diego, Calif.

Application June 28, 1949, Serial No. 101,824

4 Claims. (Cl. 43—42.28)

This invention relates to artificial lures, and more particularly to a fishing lure simulating in appearance a squid bait, such as is employed in tuna fishing and the like.

A main object of the invention is to provide an improved fishing lure which is simple in construction, inexpensive to manufacture, and which may be employed for either commercial or sport fishing.

A further object of the invention is to provide an improved fishing lure which is rugged in construction, provides a close simulation to live bait, and which is mechanically well balanced, whereby it may be drawn through the water in a position simulating the position of a live squid.

Further objects and advantages of the invention will become apparent from the following description and claims, and from the accompanying drawings, wherein:

Figure 1 is a side elevational view of a squid bait constructed in accordance with the present invention;

Figure 2 is a fragmentary side elevational view, partly in cross section, showing the structure for connection of the flexible multi-strand tail to the spool carried by the shank of the barbed hook;

Figure 3 is a view similar to Figure 2 showing a modification of the connection of the flexible multi-strand tail to the spool carried by the shank of the barbed hook;

Referring to the drawing, and more particularly to Figures 1 and 2, 11 designates the body portion of the lure, said body portion being made of suitable corrosion resistant metal and having a forwardly tapering curved contour, as shown in Figure 1. A side of body 11 is formed with a depression 13 intermediate the ends thereof. The body 11 is formed with an axial bore 14 and secured in the rear portion thereof by an Allen set screw 15 is the shank of a hook 16. As shown in Figures 1 and 2, the barb of the hook extends outwardly from the rear end of body 11. Secured to the forward portion of the body 11 is the inclined U-bolt 17, said U-bolt traversing the body in an axial plane thereof and providing a depending loop 18 for the securement of a fishing line.

It will be noted that the Allen screw 15 enters the body at the side recess 13. When viewed as in Figure 1, the end of the Allen screw 15 simulates the pupil of an eye, thereby increasing the resemblance of the lure to live bait.

The rear end of the body of the lure, Figure 2, is flat, as shown at 28. The shank of the hook 16 carries an angularly grooved spool 29 which is fixedly secured thereto and is held against the body end 28 by the securement of the shank of the hook afforded by said screw 15. A flexible or rubber skirt 21 surrounds the spool 29 and is secured on the spool 29 by means of the turns of string 30. If so desired, the string 30 may be omitted, the skirt 21 being held on the spool 29 solely by friction. The rear portion of skirt 21 is slit to define a large number of flexible elements 23 which sway loosely as the lure is drawn through the water providing a simulation of the tail movements of live bait.

In the embodiment of Figure 3, the skirt, shown at 21', has its end portion, shown at 31, clamped between the spool 29 and the end 28 of the lure body. The set screw 15 holds the shank of the hook rigidly secured with the hook bend exerting axial clamping force on the spool 29.

What is claimed is:

1. In a fishing lure, an elongated body provided with a longitudinally extending axial bore, loop means dependingly carried adjacent one end of said body for the securement thereto of a fish line, a hook including a shank and a barb dependingly supported from one end of said shank, said hook being disposed adjacent the other end of said body and having the other end of said shank extending into said bore and slidably supported therein, a spool circumposed about said shank adjacent said barb and fixedly secured to said shank, a flexible multi-strand tail having one end surrounding said spool and operatively connected thereto, and means carried by said body and engageable with said shank for fixedly positioning said spool with respect to said body.

2. In a fishing lure, an elongated body provided with a longitudinally extending axial bore, loop means dependingly carried adjacent one end of said body for the securement thereto of a fish line, a hook including a shank and a barb dependingly supported from one end of said shank, said hook being disposed adjacent the other end of said body and having the other end of said shank extending into said bore and slidably supported therein, a spool circumposed about said shank adjacent said barb and fixedly secured to said shank, a flexible multi-strand tail having one end surrounding said spool and operatively connected thereto, and means carried by said body and engageable with said shank for fixedly positioning said spool with respect to said body, said last named means comprising a screw extending transversely of said body and mounted in the latter for movement into and out of engagement with the other end of said shank.

3. In a fishing lure, an elongated body provided with a longitudinally extending axial bore, loop means dependingly carried adjacent one end of said body for the securement thereto of a fishing line, a hook including a shank and a barb dependingly supported from one end of said shank, said hook being disposed adjacent the other end of said body and having the other end of said shank extending into said bore and slidably supported therein, a spool circumposed about said shank adjacent said barb and fixedly secured to said shank in end to end confronting relation with respect to the other end of said body, a flexible multi-strand tail having one end surrounding said spool and extending between the confronting ends of said spool and body, and means carried by said body and engageable with said shank for fixedly positioning the confronting ends of said spool and body in abutment with said one end of said tail.

4. In a fishing lure, an elongated body provided with a longitudinally extending axial bore, loop means dependingly carried adjacent one end of said body for the securement thereto of a fishing line, a hook including a shank and a barb dependingly supported from one end of said shank, said hook being disposed adjacent the other end of said body and having the other end of said shank extending into said bore and slidably supported therein, a spool circumposed about said shank adjacent said barb and fixedly secured to said shank in end to end confronting relation with respect to the other end of said body, a flexible multi-strand tail having one end surrounding said spool and extending between the confronting ends of said spool and body, and means carried by said body and engageable with said shank for fixedly positioning the confronting ends of said spool and body in abutment with said one end of said tail, said last named means comprising a screw extending transversely of said body and mounted in the latter for movement into and out of engagement with the other end of said shank.

GUSTAV E. BUNKOWSKI.

REFERENCES CITED

The following references are of record in the file of this patent:

UNITED STATES PATENTS

| Number | Name | Date |
| --- | --- | --- |
| 1,537,290 | Bunker | May 12, 1925 |
| 1,884,053 | McGarraugh | Oct. 25, 1932 |
| 1,967,692 | Walker | July 24, 1934 |